BALANCED MODULATOR

Filed July 30, 1953 2 Sheets-Sheet 1

INVENTOR.
Joseph B. Batchelor, Jr.
BY
Carlson, Pitzner, Hubbard + Wolfe
Attys.

INVENTOR.
Joseph B. Batchelor, Jr.
BY
Carlson, Pitzner, Hubbard & Wolfe
Attys 2,856,587
Patented Oct. 14, 1958

2,856,587

BALANCED MODULATOR

Joseph B. Batchelor, Jr., Monroe, Ga., assignor to Wesley R. Schum, Chicago, Ill.

Application July 30, 1953, Serial No. 371,293
6 Claims. (Cl. 332—45)

The present invention relates to radio transmitters, and more particularly to an improved balanced modulator for producing a carrierless single side band output signal.

It is a primary object of the present invention to provide a novel balanced modulator which is capable of "balancing out" the carrier signal over a wide range of frequency without necessity for tuning or readjusting the modulator. It is another object to provide an improved balanced modulator arrangement which virtually eliminates all signal components except a single selected side band. It is a further object to provide a balanced modulator which is extremely efficient, which employs a minimum number of parts, and which may be inexpensively constructed. It is a related object to provide a balanced modulator in which initial adjustment may be easily and quickly performed.

It is another object to provide a balanced modulator which is flexible in use, and which may be incorported in new transmitters as an integral part, or added to existing amplitude-modulated transmitters to convert them to single side band operation.

It is a further object to provide a balanced modulator for producing single side band operation which is capable, as a result of a simple switching operation, of producing an amplitude or phase-modulated signal where desired. It is a more detailed object related to the above to provide means for automatically reducing the output of the power amplifier stages when the device is in the amplitude or phase-modulated condition. Other objects and advantages of the invention will become apparent upon reading the attached detailed description and upon reference to the drawings, in which Figure 1 is a schematic circuit diagram of a transmitter including the balanced modulator which forms the subject of the present invention.

While the invention has been described herein in connection with certain preferred embodiments, it will be understood by those skilled in the art that the invention is by no means limited to the specific embodiment shown, but includes various modifications and alternative constructions limited only by the spirit and scope of the appended claims.

Figure 1:
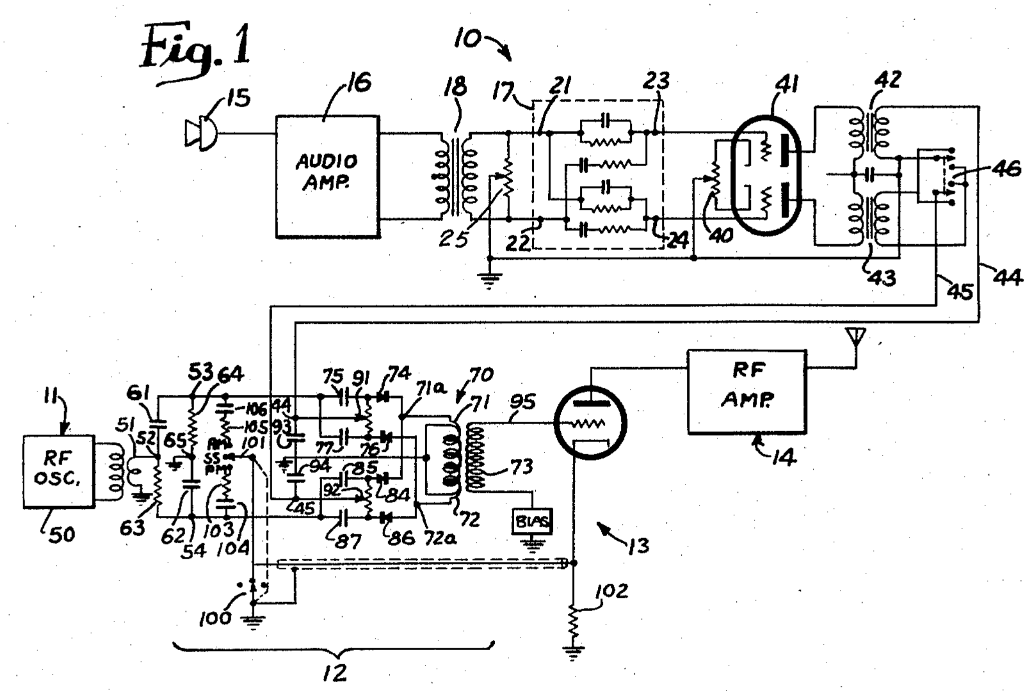

Turning now to Figure 1, there is shown a schematic drawing of a transmitter including a balanced modulator constructed in accordance with the present invention. The circuit includes a source of audio or A. F. voltage 10, a source of radio frequency or R. F. voltage 11, a balanced modulator 12, a buffer stage 13, and a power amplifier or output stage 14. The signals from the R. F. and audio sources, suitably phased, are fed into the balanced modulator. In the balanced modulator the carrier signal and one side band are eliminated and the output is in the form of a single side band signal which is then fed into the buffer and output stages. In the discussion which follows the circuit and its operation are described in detail.

Turning first to the audio source 10, a microphone 15 feeds into an audio amplifier 16 of conventional design. The audio amplifier is coupled to a 90° differential phase shift network 17 by a transformer 18. The phase shift network 17 has input terminals 21, 22 and output terminals 23, 24. The signals at the input terminals are adjusted with respect to ground by means of a potentiometer 25 to produce an output that is balanced with respect to ground at terminals 23, 24. The construction and operation of this type of network 17 is disclosed in detail in Dome Patent 2,566,876. It will suffice to say that the output voltage at 23, 24 has a differential phase of substantially 90° over the desired audio range.

The audio voltages appearing at the network output terminals 23, 24 are fed into an A. F. modulator stage. In the present instance the modulator stage includes a double triode 41 and a pair of output transformers 42, 43 feeding into output terminals 44, 45. A potentiometer 40 is provided to compensate for variations in the characteristics of the triode sections so that the output voltages are equal in magnitude and separated by 90°. A double-pole, double-throw switch 46 is provided to reverse the output winding of the transformer 43 relative to that of transformer 42. The audio signal appearing at terminals 44, 45 is applied to the balanced modulator 12, as shown. The switch 46 enables selection of either the upper or lower frequency side band, as will later appear.

Referring next to the radio frequency source 11, it may be a conventional R. F. oscillator 50 having stable frequency characteristics. The output of the R. F. oscillator is coupled to a link winding 51 having an impedance which is preferably on the order of 50 ohms. The link winding 51 is connected to the R. F. input terminal 52 of the balanced modulator.

In the balanced modulator the R. F. or carrier signal is split into two portions which are 90° out of phase with respect to one another, the two signal components appearing at terminals 53, 54. This is preferably accomplished by retarding the signal components at one terminal by 45° and by advancing the signal component at the other terminal by a like amount so that the net phase difference between the two components is 90°. In the present instance a resistance-capacitance network is used having capacitors 61, 62 and resistors 63, 64, the central terminal 65 being at ground potential.

In designing the portion of the circuit thus far described, it will be understood that the 90° relationship mentioned above, strictly speaking, exists at a single input or carrier frequency. In practice, it has been found that the oscillator frequency may be varied through a relatively broad range without having any substantial effect on the phasing of the two R. F. components relative to one another. This range is sufficient for practical purposes, for example, over a band of amateur frequencies, and, if desired, the range may be further broadened by switching capacitors of different capacity into the circuit, a matter which is well within the skill of one familiar with the art. A further design consideration which should be kept in mind is that the input impedance of the balanced modulator should match the impedance of the link coupling for maximum power transfer. Thus, assuming that the link has an impedance of 50 ohms, each of components 61—64 should have an impedance of 50 ohms at the desired carrier frequency.

The balanced modulator includes an ouput transformer 70 having a pair of identical primary windings 71, 72 and a secondary winding 73. The windings 71, 72, are oppositely connected, as shown, and have input terminals **71*a*, 72*a*, respectively. The primary windings are supplied with rectified R. F. from terminal 53 through a pair of oppositely poled diodes, respectively. Thus, it will be noted in Fig. 1 that terminal 71*a* of winding 71 is fed by a diode 74 and an associated coupling capacitor 75 while terminal 72*a* is fed by a diode 76 and capacitor 77. The primary windings are also supplied with R. F. from terminal 54, where the voltage, as previously stated, is phased at 90° with respect to the voltage at terminal 53. Tracing out this circuit, it will be seen that the winding terminal 71*a* is fed by a diode 84 and a coupling capacitor 85, while the terminal 72*a* is fed by a diode 86 and a coupling capacitor 87**, the diodes being oppositely poled.

For the purpose of injecting the two components of audio signal, balancing potentiometers 91, 92 are provided, the potentiometer 91 being connected across the inputs of the diodes 74, 76 and the potentiometer 92 being connected across the inputs of the diodes 84, 86. The sliders of the two potentiometers are connected to the audio terminals 44, 45, respectively, and are grounded with respect to R. F. by capacitors 93, 94, as shown. Ideally, the diodes should all have the same forward resistance; however, minor differences in diode resistance and any unbalance brought about by other factors such as lack of mechanical symmetry, may be effectively compensated by adjusting the potentiometers to a position of electrical balance.

To understand the manner in which the carrier signal is balanced out, attention may first be given to the upper portion of the circuit including the diodes 74, 76, which are fed from the R. F. terminal 53. During the positive half cycle, the diode 76 is conductive and applies positive voltage to terminal **72*a*, which tends to set up a flux in coil 73 in a "positive" direction. During the succeeding half cycle the diode 74 conducts, applying negative voltage to terminal 71*a*; however, since the coils are oppositely connected, the negative voltage also tends to set up flux in coil 73 in the positive direction. Since the flux tends to be in the same direction and equal in amplitude during both half cycles, it is apparent that no signal will be induced in the coil 73 at carrier frequency. The same analysis applies to the signal supplied from terminal 54** in the lower half of the circuit.

When modulation occurs, the condition of balance between the paired diodes is upset. If, for example, the modulation voltage applied to terminal 44 is positive, the diode 76 will pass more current and the diode 74 less, so that a voltage will appear across the output winding 73 which is in phase with the voltage applied to the diodes. Considering only the upper portion of the circuit, the side bands tend to get through to the winding 73 while the carrier is balanced out. The function of the lower portion of the circuit is to reinforce one of the side bands and to cancel out the other. It will suffice to say at this point that such cancellation and reinforcement result from the fact that the two R. F. and A. F. components are respectively phased at 90°.

The output of the balanced modulator appears at an output terminal 95. Such output terminal is connected to the grid of the buffer stage 13, the output of the buffer stage being fed into an R. F. amplifier 14 having conventional circuits tuned to the carrier frequency, and which therefore filter out any second harmonic. For minimum harmonic content in the broadcast signal, the buffer and amplifier stages should be biased for linear operation, although either class "A" or class "B" operation may be used. During normal single side band operation, the cathode of the buffer stage is grounded through a switch 100. However, provision is made for increasing the bias and for exciting the cathode from one side or the other of the modulator circuit to obtain an amplitude-modulated or phase-modulated signal, as covered in a succeeding paragraph.

Figure 2:
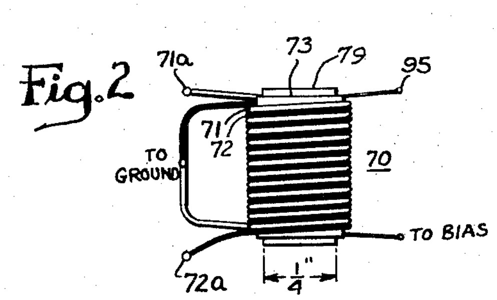
Fig. 2 shows the external appearance of the coil employed in the balanced modulator.
Figure 3:
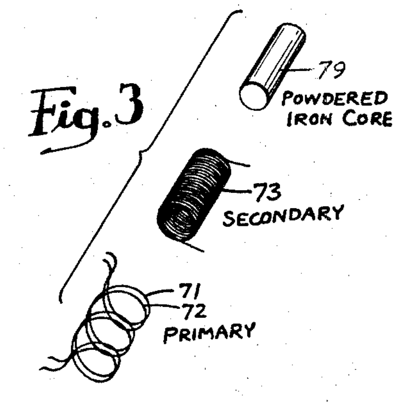
Fig. 3 is an exploded schematic representation of the coil shown in Fig. 2.

In accordance with the present invention, the output portion of the balanced modulator is made non-resonant and is arranged in a novel fashion to produce balanced operation, i. e., rejection of carrier, over a wide range of frequency, on the order of 20:1, while permitting transfer of the single side band signal with a high degree of efficiency over this entire range. The transformer for accomplising this is set forth in Figs. 2 and 3, Fig. 2 showing the general external appearance and Fig. 3 showing the windings is exploded relation. The transformer is distinguished by a bifilar primary winding and by extremely close coupling between the primary and secondary windings. Close coupling is facilitated by use of a powdered iron core 79. In a practical embodiment of the invention, this core may be ¼" in diameter and ½" in length. The secondary winding 73 is wound directly over the core 79 and may consist of 28 turns of No. 28 enameled wire wound closely spaced in a symmetrical layer. The secondary winding is covered with a layer of insulating tape on the order of .002 inch in thickness. The primary or bifilar winding is next wound over the tape. This winding preferably consists of 12 turns of a double strand of No. 28 enameled wire. Use of a double strand of ordinary enameled wire is preferred over the use of two strands included in a common insulating jacket, since even spacing between all of the turns is insured.

Figure 4:
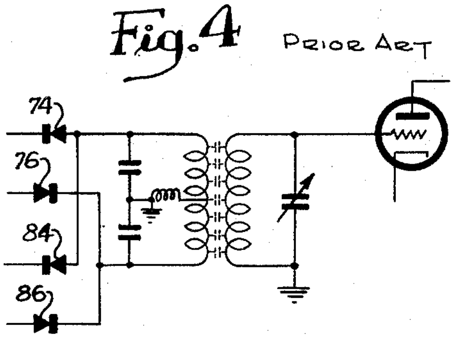
Fig. 4 PRIOR ART
Fig. 4 shows a conventional balanced modulator arrangement with the distributed capacity indicated by the dotted lines.
Figure 5:
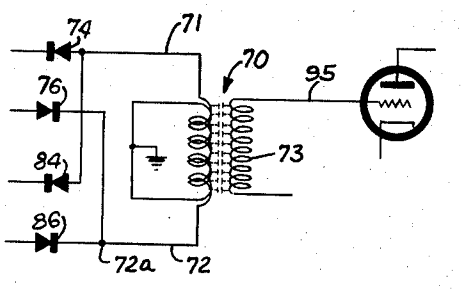
Fig. 5 shows the distributed capacity characteristic of the present balanced modulator.

Use of the above non-resonant circuit including the improved bifilar coil in the balanced modulator has brought about a substantial improvement in operation, as compared to balanced modulators of conventional type. First of all, conventional balanced modulators employing tuned coils are inherently limited to the resonant frequency and are characterized by relatively loose "resonant" coupling. In contrast, the present modulator avoids the resonant condition and instead uses extremely tight coupling with true transformer action between primary and secondary. Phase shift between primary and secondary is therefore almost completely eliminated. Secondly, conventional balanced modulators have employed separate primary coils having the stray capacitive coupling shown dotted in Fig. 4. It is apparent in this figure that the primary windings are inherently unbalanced by the stray or distributed capacity, since one coil is coupled primarily to the grounded end of the secondary winding and the other coil is coupled primarily to the grid end of the secondary winding. In the present device, the distributed capacities are as shown in Fig. 5 and each of the primary windings is capacity-coupled to the grounded side and the grid side of the secondary winding to an equal degree. Thus, extraneous capacity effects are effectively neutralized and circuit balance may be maintained over a wide range of frequency, for example, the range of 1,500 kc. to 30 mc. This constitutes a substantial advantage in multi-band professional equipment and in amateur equipment where the bulk of the activity is concentrated in the above range. It will be apparent to one skilled in the art that the invention is not limited to such frequency range, but is equally applicable to all frequency ranges now used for communication purposes.

An additional advantage brought about by the broadband features of the above balanced modulator resides in the fact that any harmonics appearing in the R. F. carrier signal supplied to the balanced modulator, as well as the carrier itself, are effectively cancelled out. In the particular design described above, this includes all such harmonics having frequencies up to 30 mc. It is found that there is also substantial attenuation of harmonics of higher frequency, since the transmission characteristics of the output transformer fall off rather sharply, in any event, beyond a frequency of about 35 mc.

In adjusting the above transmitter circuit, the audio network 17 is so adjusted that the audio voltage at output terminal 45 differs in phase by 90° from the voltage existing at terminal 44, either leading or lagging, depending upon the setting of the switch 46. The input network of the balanced modulator is then adjusted so that the voltage components at terminals 53, 54 differ in phase by 90° at the desired operating frequency. In the event that operation over a range of frequency is desired, the circuit is adjusted for 90° phasing for frequency at the center of such range. It is found in practice that a single setting of the input components 61—64 is adequate to cover a range of several hundred kc., and satisfactory operation may be secured over a band of professional or amateur frequencies without changing the settings. It will be apparent to one skilled in the art that other preset values of capacitance may be switched into the circuit by a suitable switching means to provide operation in a number of different operating bands.

With a carrier signal applied to the balanced modulator, the potentiometers 91, 92 are adjusted for zero carrier at the output terminal 95. Once this adjustment is made, controls 91, 92 need not be touched for operation anywhere within the frequency range of 1,500 kc. to 30 mc.

Figure 6:
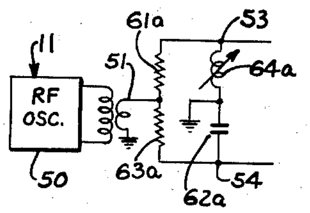
Fig. 6 shows an alternate form of phase shifting network which may be employed in the circuit of Fig. 1.

While I prefer to use a resistance-capacitance type of input circuit, I have found that an inductance-capacitance circuit works equally well. Such a circuit is shown in Fig. 6. It employs two resistors **61*a*, 63*a*, a capacitor 62*a* and an inductance 64*a*, so chosen that the signal components at terminals 53, 54** are 90° out of phase at the nominal operating frequency.

Figure 7:
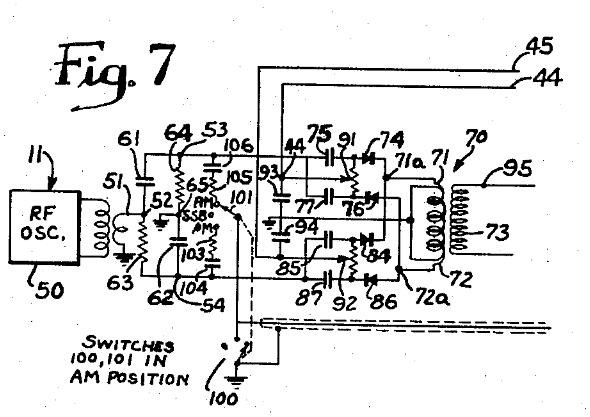
Fig. 7 shows the modulator connected for amplitude modulation.

It is one of the features of the present invention that amplitude or phase modulation may be obtained and the gain of the amplifier stages reduced by a simple switching operation and without necessity for throwing the single side band settings out of adjustment. This is accomplished by the switch 100 previously referred to and the switch 101, which couples the cathode of the buffer stage to one side or the other of the balanced modulator circuit, the switches 100, 101 being ganged together. In the central position, designated "SSB," the circuit operates as described above. In the right-hand position the switch 101 serves to connect the cathode of the buffer to the upper leg 53 of the balanced modulator, as shown in Fig. 7, through a series resistor 105 and a phasing capacitor 106. As a result of the same switching operation, switch 100 is moved to its right-hand position, which cuts a cathode bias resistor 102 (Fig. 1) into the circuit to reduce the gain of the buffer stage by about 50%. Where a tube having the characteristics of a type 6BK5 is used as a buffer, each of the resistors 102, 103 may be on the order of 200 ohms.

The connection illustrated in Fig. 7 effectively bridges the balanced modulator circuit so that a portion of the carrier is "injected" into the cathode of the buffer stage. Such injected carrier is properly phased to produce amplitude modulation. Because of the increase in the resistance of the buffer cathode circuit brought about by the cathode resistor 102, the gain of the buffer is reduced, resulting in correspondingly reduced excitation of the R. F. amplifier 14 when operating in class B. This reduces the average power output of the R. F. amplifier, which provides an automatic safeguard for the tubes in the R. F. amplifier stage. The advantage brought about by the reduction in output will be apparent when it is considered that an output tube which may have a rating of 1 kilowatt for single side band operation may have a rating of only 100 watts when transmitting an amplitude-modulated signal.

Figure 8:
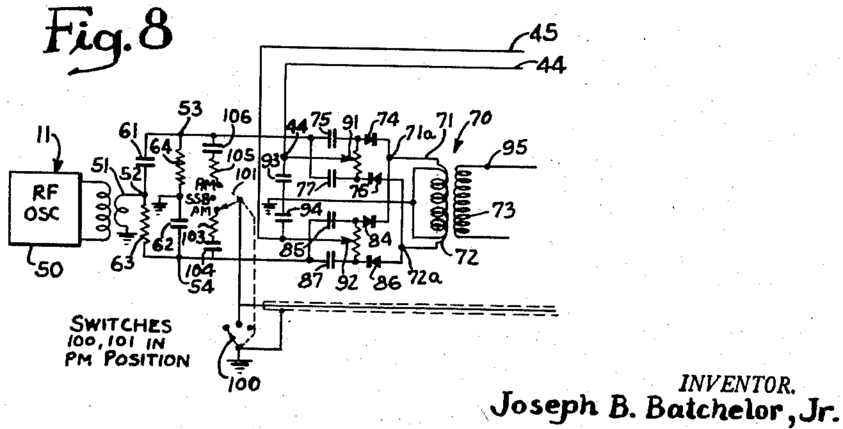
Fig. 8 shows the modulator connected for phase modulation.

The circuit shown in Fig. 1 may also be used to provide phase modulation of the transmitted signal. The connection for phase modulation is shown in Fig. 8. In the latter figure it will be noted that the cathode of the buffer stage is connected to the lower terminal 54 of the balanced modulator via a resistor 103 and capacitor 104. The capacitors 104 and 106 should be adjustable from 50 to 5000 mmf. in order to compensate for stray coupling and to insure that a "pure" a. m. or p. m. signal is produced, the adjustment of these capacitors being within the skill of the art. Ordinarily, the resistance 103 used for p. m. may be less than that used for a. m. for greater drive and to utilize the rated power output of the amplifier tubes.

When using the balanced modulator in an existing installation to provide single side-band operation, it is sufficient to connect the unit directly ahead of a buffer stage, readjusting the bias of the buffer and subsequent stages to provide operation in class "A" or class "B." Means for producing the two audio signals having a differential phasing of 90° are also required, and in a commercial embodiment will be included in the same unit as the balanced modulator. A power increase of 8 times may thus be obtained from a given power amplifier by this simple conversion.

It is apparent that the above unit offers a flexibility and facility of operation not previously obtainable. Suppression of the unwanted side band to the extent of 40 decibels is readily possible using only standard low-cost components.

What I claim is:

1. In a radio transmitter for generating a single side band signal, the combination comprising first and second sources of carrier signal having a relative phasing of 90°, first and second sources of audio signal being relatively phased at 90°, a balanced modulator transformer having a pair of bifilar primary windings and a secondary winding symmetrically arranged with respect thereto, means including a first pair of oppositely poled diodes for coupling said first carrier and audio signal sources to the respective primary windings, means including a second pair of oppositely poled diodes for coupling the second carrier and audio signal sources to the respective primary windings, said primary windings being reversely arranged to eliminate any carrier signal component in said secondary winding, said windings being non-resonant at carrier frequency and having a closely coupled powdered iron core to effect broad band transformer action, and tunable amplifier means coupled to the secondary winding of said transformer for amplifying the signal therein.

2. In a radio transmitter, the combination comprising an oscillator, a broad band phase shift network coupled to said oscillator for producing first and second carrier signals having a relative phasing of 90°, means for producing first and second audio signals having a relative phasing of 90°, a balanced modulator transformer having a pair of identical primary windings and a secondary winding symmetrically arranged with respect thereto, means including a first pair of oppositely poled diodes for coupling said first carrier signal to the respective primary windings, means for coupling said first audio signal equally to said first pair of diodes, means including a second pair of oppositely poled diodes for coupling the second carrier signal to the respective primary windings, means for coupling said second audio signal equally to said second pair of diodes, the primary windings being reversely arranged to balance out carrier signal components in said secondary winding, a high permeability core in said windings to provide broad band transformer action to minimize phase shift between the primary and secondary windings, and an amplifier having generally linear characteristics coupled to the secondary winding for amplifying the single side band signal appearing therein.

3. In a radio transmitter for generating a single side band signal, the combination comprising first and second sources of carrier signal having a relative phasing of 90°, first and second sources of audio signal being relatively phased at 90°, a balanced modulator transformer having a pair of identical but oppositely connected primary windings and a secondary winding symmetrically arranged with respect thereto, means including a first pair of oppositely poled diodes for coupling said first carrier and audio signal sources to the respective primary windings, means including a second pair of oppositely poled diodes for coupling the second carrier and audio signal sources to the respective primary windings, the primary windings being intimately coupled together and free of resonant effect at the frequency of the carrier signal to permit variation in the frequency of said carrier signal over a broad range, and means coupled to the secondary winding of said transformer for amplifying the signal therein.

4. In a radio transmitter, the combination comprising first and second sources of carrier signal having a relative phasing of 90°, first and second sources of audio signal being relatively phased at 90°, a balanced modulator transformer having a pair of identical primary windings and a secondary winding symmetrically arranged with respect thereto, means including a first pair of oppositely poled diodes for coupling said first carrier and audio signal sources to the respective primary windings, means including a second pair of oppositely poled diodes for coupling the second carrier and audio signal sources to the respective primary windings, said primary windings being so arranged that each half cycle of carrier signal from each of the carrier sources tends to produce flux in the secondary winding in the same direction, an amplifier stage having grid and cathode input circuits, means coupling the grid input circuit to said secondary winding, and means for alternatively (1) grounding the cathode input circuit for single side band, suppressed carrier transmission and (2) coupling said cathode input circuit to one of said carrier signal sources for modulated carrier transmission.

5. In a radio transmitter, the combination comprising first and second sources of carrier signal having a relative phasing of 90°, first and second sources of audio signal having a relative phasing of 90°, means for combining the signals from said first sources and said second sources, respectively, to form first and second modulated carrier signals, a balanced modulator transformer having a pair of identical primary windings and a secondary winding symmetrically arranged with respect thereto, means including a first pair of oppositely poled diodes for coupling said first modulated signal to the respective primary windings, means including a second pair of oppositely poled diodes for coupling the second modulated signal to the respective primary windings, the primary windings being reversely arranged to balance out any carrier signal component in said secondary winding, an amplifier stage having grid and cathode input circuits, the grid input circuit being coupled to said secondary winding for transmission by said amplifier of a single side band, suppressed carrier signal, and means for connecting said cathode input circuit to at least one of said sources of carrier signal for transmission of a modulated carrier signal.

6. In a radio transmitter, the combination comprising first and second sources of carrier signal having a relative phasing of 90°, first and second sources of audio signal having a relative phasing of 90°, means for combining the signals from said first sources and said second sources, respectively, to form first and second modulated carrier signals, a balanced modulator transformer having a pair of identical primary windings and a secondary winding symmetrically arranged with respect thereto, means including a first pair of oppositely poled diodes for coupling said first modulated signal to the respective primary windings, means including a second pair of oppositely poled diodes for coupling the second modulated signal to the respective primary windings, the primary windings being reversely arranged to balance out any carrier signal component in said secondary winding, an amplifier stage having grid and cathode input circuits, the grid input circuit being coupled to said secondary winding for transmission by said amplifier of a single side band, suppressed carrier signal, and means for alternatively connecting said cathode input circuit to at least one of said sources of carrier signal for transmission by said amplifier of a modulated carrier signal and for simultaneously reducing the gain of said amplifier stage.

References Cited in the file of this patent

UNITED STATES PATENTS

| | | |
|---|---|---|
| 1,773,116 | Potter | Aug. 19, 1930 |
| 2,248,250 | Peterson | July 8, 1941 |
| 2,358,520 | Landon | Sept. 19, 1944 |
| 2,504,050 | Rodhe | Apr. 11, 1950 |
| 2,545,788 | McIntosh | Mar. 20, 1951 |
| 2,654,058 | McIntosh | Sept. 29, 1953 |

OTHER REFERENCES

Pub. (I), "A 75 and 20 Meter Single-Sideband Exciter," QST, Nov. 1949, pp. 40–42.